United States Patent
Diu

(10) Patent No.: US 10,705,708 B2
(45) Date of Patent: Jul. 7, 2020

(54) DATA EXPANSION CONTROL

(71) Applicant: INTERNATIONAL BUSINESS MACHINES CORPORATION, Armonk, NY (US)

(72) Inventor: Wayne Diu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 16/205,160

(22) Filed: Nov. 29, 2018

(65) Prior Publication Data

US 2020/0174649 A1 Jun. 4, 2020

(51) Int. Cl.
*G06F 3/0484* (2013.01)
*G06F 3/0482* (2013.01)

(52) U.S. Cl.
CPC ........ *G06F 3/04847* (2013.01); *G06F 3/0482* (2013.01)

(58) Field of Classification Search
CPC .......................... G06F 3/0482; G06F 3/04847
See application file for complete search history.

(56) References Cited

U.S. PATENT DOCUMENTS

| | | | |
|---|---|---|---|
| 7,127,449 B2 * | 10/2006 | Barsness | G06Q 30/0601 705/26.1 |
| 7,134,093 B2 | 11/2006 | Etgen et al. | |
| 8,375,014 B1 * | 2/2013 | Brocato | G06F 16/213 707/705 |
| 8,504,938 B2 | 8/2013 | Vaughan et al. | |
| 9,202,297 B1 | 12/2015 | Winters et al. | |
| 2002/0143735 A1 * | 10/2002 | Ayi | G06F 16/21 |
| 2003/0074356 A1 * | 4/2003 | Kaler | G06F 21/6218 |
| 2004/0109011 A1 * | 6/2004 | Peterson, Jr. | G06F 16/9577 715/700 |
| 2005/0278656 A1 | 12/2005 | Goldthwaite et al. | |

(Continued)

FOREIGN PATENT DOCUMENTS

WO 2018103218 A1 6/2018

OTHER PUBLICATIONS

IBM, "QRadar Cloud Visibility," IBM Security App Exchange, Aug. 30, 2018, p. 1, Version 1.0.0, https://exchange.xforce.ibmcloud.com/hub/extension/2c7bc179ba5e7c6c23c2be648f3da1c2, Accessed on Nov. 28, 2018, Grace Period Disclosure.

(Continued)

*Primary Examiner* — Amy M Levy
(74) *Attorney, Agent, or Firm* — Rakesh Roy

(57) ABSTRACT

A method, computer system, and a computer program product for data visualization is provided. The present invention may include, in response to detecting, by a graphical user interface (GUI), an initial actuation of a data scope trigger, displaying, by the GUI, an initial amount of a dataset. The present invention may also include, in response to detecting, by the GUI, a subsequent actuation of the data scope trigger within a predefined period of time, modifying an amount of the dataset being displayed by the GUI, and adjusting a trigger user interface (UI) of the data scope trigger to reflect a subsequent amount of the dataset that is available to be displayed by the GUI in response to the detected subsequent actuation of the data scope trigger.

20 Claims, 9 Drawing Sheets

(56) References Cited

U.S. PATENT DOCUMENTS

| | | | | |
|---|---|---|---|---|
| 2007/0089068 A1* | 4/2007 | Alexander | ............ | G06F 3/0482 |
| | | | | 715/788 |
| 2011/0067025 A1* | 3/2011 | Cragun | ............... | G06F 9/45512 |
| | | | | 718/100 |
| 2012/0266108 A1* | 10/2012 | Lien | ................... | G01C 21/3611 |
| | | | | 715/841 |
| 2015/0040052 A1* | 2/2015 | Noel | ................... | G06F 3/04847 |
| | | | | 715/771 |
| 2016/0048989 A1* | 2/2016 | Gabbidon | ............... | G06F 16/44 |
| | | | | 715/716 |
| 2017/0300536 A1* | 10/2017 | Gupta | ............... | G06F 16/24545 |
| 2017/0315683 A1* | 11/2017 | Boucher | ............... | G06F 3/0486 |

OTHER PUBLICATIONS

IBM, "QRadar Cloud Visibility App," IBM Knowledge Center, Aug. 30, 2018, p. 1-2, Version 1.0.0, https://www.ibm.com/support/knowledgecenter/en/SS42VS_7.2.8/com.ibm.csaapp.doc/c_Qapps_CSA_intro.html, Accessed on Nov. 28, 2018, Grace Period Disclosure.

IBM, "Slider and Button Controls for Graphical User Interface," An IP.com Prior Art Database Technical Disclosure, Mar. 19, 2003, p. 1-2, IP.com Disclosure No. IPCOM000011832D.

Mell et al., "The NIST Definition of Cloud Computing," National Institute of Standards and Technology, Sep. 2011, p. 1-3, Special Publication 800-145.

\* cited by examiner

DATA EXPANSION CONTROL

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM QRadar Cloud Visibility, made available to the public on Aug. 30, 2018. The following disclosure is submitted under 35 U.S.C. § 102(b)(1)(A).

BACKGROUND

The present invention relates generally to the field of computing, and more particularly to data visualization.

When analyzing a large volume of data, it can be difficult to visualize and comprehend the entire dataset at the same time. A user may want to control the scope of the data being presented in order to meaningfully analyze and extract information from the dataset.

SUMMARY

Embodiments of the present invention disclose a method, computer system, and a computer program product for data visualization. The present invention may include, in response to detecting, by a graphical user interface (GUI), an initial actuation of a data scope trigger, displaying, by the GUI, an initial amount of a dataset. The present invention may also include, in response to detecting, by the GUI, a subsequent actuation of the data scope trigger within a predefined period of time, modifying an amount of the dataset being displayed by the GUI, and adjusting a trigger user interface (UI) of the data scope trigger to reflect a subsequent amount of the dataset that is available to be displayed by the GUI in response to the detected subsequent actuation of the data scope trigger.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
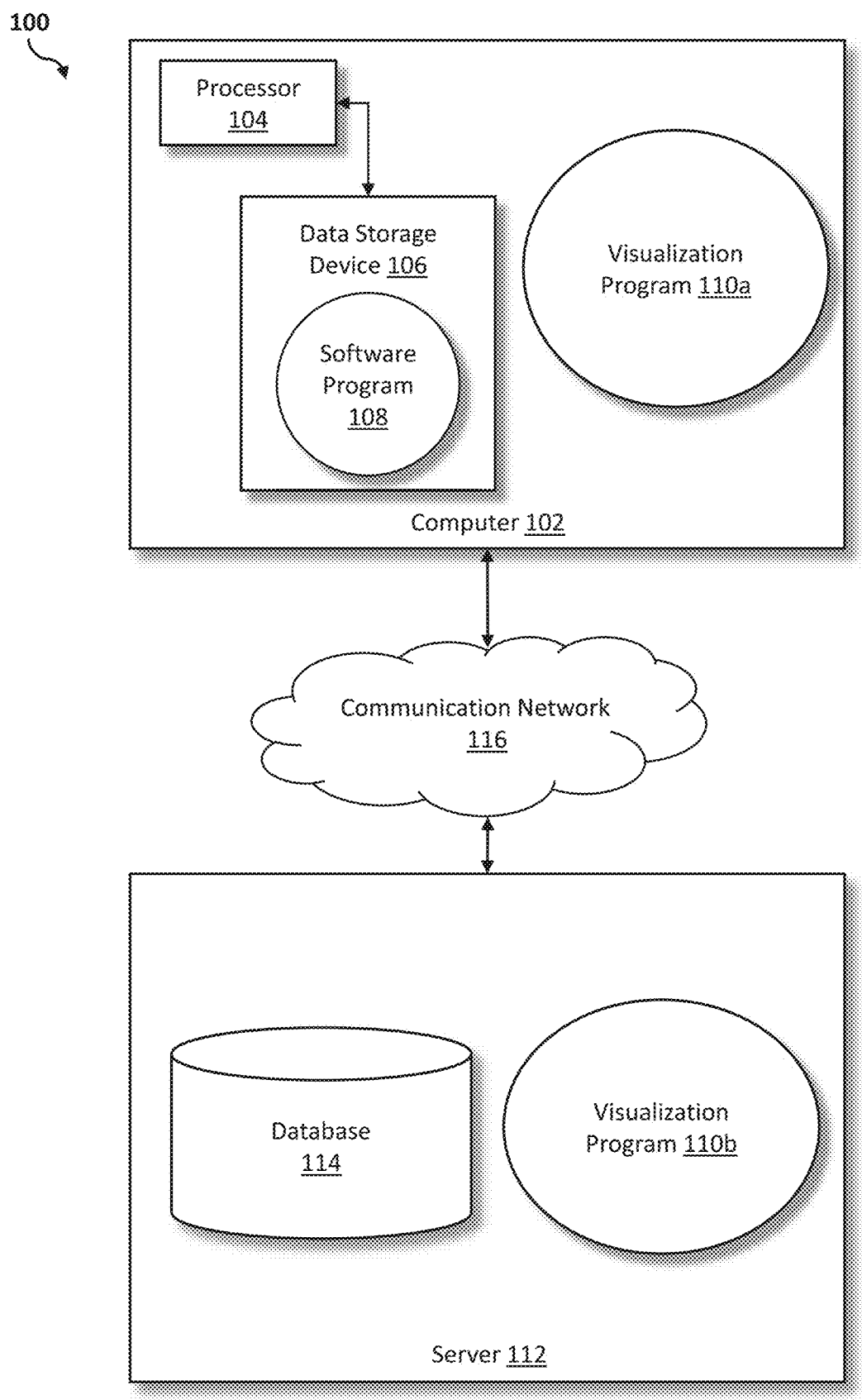
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for controlling data visualization. As such, the present embodiment has the capacity to improve the technical field of data visualization by providing a graphical user interface (GUI) for gradually controlling the scope of the data being presented. More specifically, a user may run a visualization program to view a large dataset. The user may adjust the data being presented by clicking a button which may react differently each time. The first time the button is clicked, an initial amount of data may be displayed and the button user interface (UI) may be adjusted to show what will happen the next time the button is clicked. On subsequent times that the button is clicked, the data being displayed may increase again and the button UI may be adjusted again to show what will happen the next time the button is clicked. The user may continue to click the button until the maximum available data is displayed. After the button is clicked, the button UI may change for a configurable period of time before reverting back to the initial state of the button UI. Also, if some other event occurs (e.g., the user performs a different UI gesture or actuation), the button may revert back to the initial state of the button.

As described previously, when analyzing a large volume of data, it can be difficult to visualize and comprehend the entire dataset at the same time. A user may want to control the scope of the data being presented in order to meaningfully analyze and extract information from the dataset.

Existing UI controls, such as slider controls, are insufficient for this task. A user may implement a slider control to visualize a subset of data. However, if the user then manually controlled the subset of data to be visualized, for example, by clicking individual checkboxes, the slider control would remain static and no longer match the state of the visualized data. In one example, the slider control may indicate the top 20 nodes, but the visualization may only display the top 19 nodes if the user manually deselected the $20^{th}$ node. In another example, the slider control may indicate the top 20 nodes, but the visualization may display the top 19 nodes plus the $25^{th}$ node if the user manually selected the $25^{th}$ node.

Other existing UI controls, such as spinner controls, are similarly insufficient for this task. A user may implement a spinner control in conjunction with a button to gradually add elements or nodes to a visualization. Requiring two UI actuations or gestures for performing one task may be especially difficult for touch screen devices as the user would need to use the spinner control to enter the number of elements or nodes to be visualized and then click the add button each time. For example, the user would set the spinner control to 20 nodes and would then need to click the add button to visualize the 20 nodes. If the user wanted to visualize 30 nodes, the user would then need to adjust the spinner control to 30 nodes and would then need to click the add button again. Further, similar to the slider control, if the user then manually controlled the subset of nodes to be visualized, for example, by clicking individual checkboxes, the spinner control would remain static and no longer match the state of the visualized nodes.

Therefore, it may be advantageous to, among other things, provide a UI control for gradually scaling the scope of data being presented. It may also be advantageous to provide a UI control that may include dynamic visual states. It may further be advantageous to provide a UI control that may automatically adjust a visual state thereof in response to a user interaction with the UI control. It may also be advantageous to provide dynamic visual states for a UI control configured to reflect the subsequent scope of data to be presented in response to a user interaction with the UI control.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a visualization program 110a. The networked computer environment 100 may also include a server 112 that is enabled to run a visualization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114.

According to various implementations of the present embodiment, the visualization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the visualization program 110a, 110b (respectively) to gradually control a scope of data being presented. The visualization method is explained in more detail below with respect to FIGS. 2 and 3A-3D.

Figure 2:
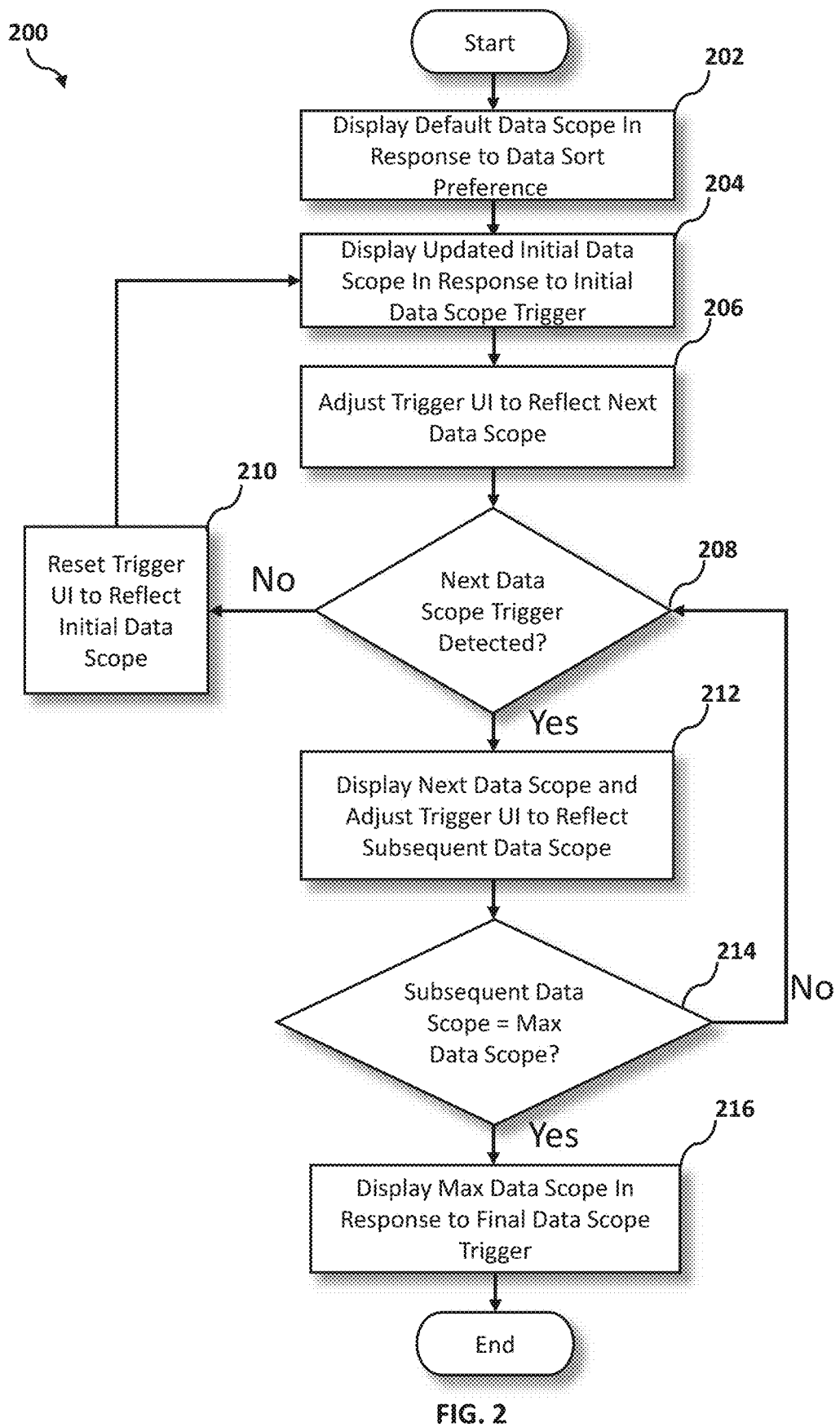
FIG. 2 is an operational flowchart illustrating a process for gradually visualizing a dataset according to at least one embodiment.

Referring now to FIG. 2, an operational flowchart illustrating the exemplary visualization process 200 used by the visualization program 110a, 110b according to at least one embodiment is depicted.

At 202, a default data scope is displayed in response to a data sort preference. A user may run the visualization program 110a, 110b on a user device (e.g., client computer 102) in order to visualize a dataset including one or more data points (e.g., elements, nodes). The visualization program 110a, 110b may provide a GUI (e.g., a dashboard) including a presentation window configured to display the data visualization on the user device. The user may interact with the GUI and select a dataset for visualization by the visualization program 110a, 110b. In response, the visualization program 110a, 110b may retrieve the user selected dataset stored locally in a data storage device 106 of the user device or may retrieve (e.g., via communication network 116) the user selected dataset stored remotely in a database 114 of a server computer 112. In one embodiment, the user may implement the visualization program 110a, 110b to retrieve real-time or near real-time data (e.g., real-time or near real-time network flow information) for visualization. The visualization program 110a, 110b may retrieve the real-time or near real-time data obtained through one or more sensors or through communication network 116.

The visualization program 110a, 110b may display the data points of the retrieved dataset in a sorting window included in the GUI. The visualization program 110a, 110b may provide one or more sorting options for listing the data points in the sorting window. The visualization program 110a, 110b may provide one or more sorting options according to various applications and datasets (e.g., sorting by number of traffic flows for internet specific datasets; sorting by number of social connections for social network datasets). Initially, the visualization program 110a, 110b may list the data points in the sorting window according to a default order. In another embodiment, the visualization program 110a, 110b may list the data points in the sorting window according to the sorting option indicated by the user (e.g., via selecting the sorting option from a drop-down menu).

In one embodiment, the visualization program 110a, 110b may display a default data scope or selection of the dataset (e.g., default selection of the data points). In one embodiment, the default selection may be empty (e.g., no data points may be displayed), the default selection may be full (e.g., all data points may be displayed), or the visualization program 110a, 110b may implement some other default selection which may be configurable by the user.

For example, a user running the visualization program 110a, 110b on a user laptop interacts with a dashboard of the visualization program 110a, 110b in order to visualize a dataset X including 100 data points. The visualization program 110a, 110b transmits a request from the user laptop to the database 114, via communication network 116, and retrieves the dataset X from the database 114. Initially, the visualization program 110a, 110b lists the 100 data points, according to a default order, in a sorting window provided in the dashboard. The user interacts with a drop-down menu and selects an option to sort the data points according to number of total communications. The visualization program 110a, 110b receives the user selected sorting preference and adjusts the listing of the 100 data points accordingly.

Then, at 204, an updated initial data scope is displayed in response to an initial data scope trigger. As previously described, visualizing the dataset incrementally may provide better comprehension of one or more relationships between the data points, relative to visualizing the relationships between all of the data points of the entire dataset at the same time. Accordingly, once the dataset is sorted, the user may implement the visualization program 110a, 110b to gradually modify (e.g., increase or decrease) the scope or amount of the dataset being visualized.

In one embodiment, the visualization program 110a, 110b may display the default data scope at 202 before the initial data scope is displayed in response to the initial data scope trigger. In one embodiment, the default data scope may be the same as the initial data scope. In another embodiment, the default data scope may be different than the initial data scope as noted at 202 (e.g., empty, full, some other default selection which may be configurable by the user). If the visualization program 110a, 110b displays the default selection of the dataset, the initial data scope that is displayed in response to the initial data scope trigger may include an updated initial data scope.

The amount of the dataset being visualized may be gradually increased or decreased. In one embodiment, the amount of the dataset being visualized may be gradually increased or decreased by a configurable predetermined amount of data. The visualization program 110a, 110b may divide the dataset into one or more batches, each including a number of data points (e.g., nodes n). In one embodiment, the visualization program 110a, 110b may set a default number of nodes (e.g., n=10 nodes) in each batch or may provide the user with an option to set a user-defined number of nodes in each batch. The visualization program 110a, 110b may increase the scope or amount of the dataset for visualization by increasing the number of batches included in the visualized dataset, thereby increasing the number of data points in the visualized dataset. Similarly, the visualization program 110a, 110b may decrease the scope or amount of the dataset for visualization by decreasing the number of batches included in the visualized dataset, thereby decreasing the number of data points in the visualized dataset.

The visualization program 110a, 110b may provide a data scope trigger (e.g., button) or other control mechanisms in the GUI which may be configured to increase or decrease the amount of the visualized dataset in the presentation window. Specifically, in response to each actuation (e.g., click using a mouse/digital pointer/touch screen) of the trigger by the user, the visualization program 110a, 110b may detect the trigger actuation and increase or decrease the scope or amount of the dataset for visualization accordingly.

In one embodiment, the trigger may include a trigger UI (e.g., button interface or button label) corresponding with an amount of the visualized dataset. The trigger UI may include a dynamic component linked to an actuation of the trigger. The dynamic component of the trigger UI may signal or reflect the next available amount of the dataset which may be visualized upon actuation of the trigger (e.g., the dynamic button label may textually indicate what data may be displayed when the button is clicked).

In one embodiment, an initial trigger UI may reflect an initial scope or amount of the dataset (e.g., first batch of data points) which may be visualized upon actuation of the trigger. Accordingly, in response to a first or initial trigger actuation (e.g., initial click of the button) by the user, the visualization program 110a, 110b may visualize and display the initial scope or amount of the dataset in the presentation window of the GUI.

Continuing with the previous example, the visualization program 110a, 110b lists the 100 data points in the sorting window of the dashboard, sorted by the number of total communications, as indicated by the user-selected sorting option. The visualization program 110a, 110b divides the 100 data points of the dataset X into ten batches, each batch including ten nodes n. The visualization program 110a, 110b provides a button Y configured to increase the amount of the visualized dataset X in the presentation window of the dashboard. The button Y includes a dynamic button label. In an initial state, the dynamic button label provides a textual phrase "select top 10" displayed on the button Y. The user clicks the button Y to view the first batch of 10 data points (n=10) from the list of 100 data points sorted by the number of total communications. In response, the visualization program 110a, 110b visualizes and displays the initial amount of the dataset in the presentation window of the dashboard.

Then, at 206, the trigger UI is adjusted to reflect the next data scope. Once the trigger is actuated by the user at 204, in addition to displaying the initial amount of the visualized dataset, the visualization program 110a, 110b may adjust the trigger UI (e.g., button label) to reflect the next amount of the dataset which may be visualized and displayed (e.g., the dynamic button label may be adjusted to textually indicate what data may be displayed the next time the button is clicked).

In one embodiment, the visualization program 110a, 110b may also modify the trigger UI in order to provide an actuation prompt for the user. In one embodiment, the actuation prompt may include animating the trigger (e.g., the button may blink or flash) or applying other visual modifications (e.g., via color, highlight, shadow) to the trigger which may draw the attention of the user and prompt the user to actuate the trigger.

Continuing with the previous example, after the button Y is clicked by the user, the visualization program 110a, 110b displays the initial amount of the visualized dataset (the top 10 data points) in the presentation window of the dashboard. In addition, the visualization program 110a, 110b adjusts the dynamic button label—from the initial state to a second state—such that the dynamic button label now provides a textual phrase "select top 20" displayed on the button Y. Further, the dynamic button label provides an actuation prompt by animating the button Y to flash. As such, the user is prompted to click on the flashing button Y in order to view the next amount (top 20 data points) of the visualized dataset.

Next, at 208, an inquiry is made to determine if the next data scope trigger is detected. The visualization program 110a, 110b may implement one or more conditions (e.g., a time condition, a continuity condition) for determining that the next data scope trigger is detected. Under the time condition, the visualization program 110a, 110b may determine that the next data scope trigger is detected if the user actuates the trigger (e.g., clicks of the button) within a predefined timeframe (e.g., period of time). In one embodiment, the predefined timeframe may include a default timeframe set by the visualization program 110a, 110b. In at least one embodiment, the visualization program 110a, 110b may provide the user with an option to set a user-defined timeframe. In one embodiment, the user may set the user-defined timeframe to infinity such that the user may effectively disable the time condition implemented by the visualization program 110a, 110b. Under the continuity condition, the visualization program 110a, 110b may determine that the next data scope trigger is detected if the user maintains continuity and actuates the trigger (e.g., clicks of the button), instead of performing a different UI gesture or actuation (e.g., clicking a different button). In yet another embodiment, the trigger UI may partially change after the time condition has expired (e.g., the textual phrase may remain, but the trigger UI may stop flashing), with the continuity condition still in effect.

If the time condition or the continuity condition is not met by the user, the visualization program 110a, 110b determines that the next data scope trigger is not detected at 208, and therefore resets the trigger UI to reflect the initial data scope at 210. The visualization program 110a, 110b may maintain the adjustments or modifications to the trigger UI (e.g., reflection of data scope or actuation prompt) for the duration of the predefined timeframe before reverting the trigger UI to the initial state of the trigger UI. Similarly, if the visualization program 110a, 110b detects a different UI gesture from the user device, the visualization program 110a, 110b may revert the trigger UI to the initial state of the trigger UI. Thereafter, the visualization process 200 may return to 204 where further actuation of the trigger may be detected by the visualization program 110a, 110b as the initial data scope trigger of 204. Accordingly, the visualization program 110a, 110b may visualize and display the initial amount of the dataset in the presentation window of the GUI as described in 204.

Continuing with the previous example, the button Y includes the textual phrase "select top 20" displayed thereon and is animated to flash for a predefined timeframe of five seconds. The user does not click the button Y within the predefined timeframe of five seconds. Accordingly, the visualization program 110a, 110b implements the dynamic button label to revert the button Y back to the initial state such that the button Y now includes the textual phrase "select top 10" displayed thereon and is no longer animated to flash. Similarly, if the user clicks a different button Z or manually selects/deselects one or more of the data points listed in the sorting window, the visualization program 110a, 110b implements the dynamic button label to revert the button Y back to the initial state. Thereafter, the user clicks the button Y which now includes the textual phrase "select top 10" displayed thereon. In response, the visualization program 110a, 110b displays the initial amount of the visualized dataset (the top 10 data points) in the presentation window of the dashboard.

However, if the time condition and the continuity condition are met by the user, the visualization program 110a, 110b determines that the next data scope trigger is detected at 208, and therefore, the visualization program 110a, 110b displays the next data scope and adjusts the trigger UI to reflect the subsequent data scope at 212.

Continuing with the previous example, the button Y includes the textual phrase "select top 20" displayed thereon and is animated to flash for a predefined timeframe of five seconds. The user clicks the button Y within three seconds. Accordingly, the visualization program 110a, 110b determines that the time condition and the continuity condition are met by the user. In response, the visualization program 110a, 110b displays the next amount of the visualized dataset (the top 20 data points) in the presentation window of the dashboard. In addition, the visualization program 110a, 110b adjusts the dynamic button label—from the second state to a third state—such that the dynamic button label now provides a textual phrase "select top 30" displayed on the button Y. Further, the dynamic button interface provides an actuation prompt by animating the button Y to flash for the predefined timeframe of five seconds. As such, the user is prompted to click on the flashing button Y in order to view the subsequent amount (top 30 data points) of the visualized dataset.

Then, at 214, another inquiry is made to determine if the subsequent data scope is the maximum data scope. The visualization program 110a, 110b may gradually increase the amount of the visualized dataset until the scope of the visualized dataset is increased to the maximum available data points. The visualization program 110a, 110b may count the number of batches of data points in each dataset to determine if the subsequent data scope is the maximum data scope. In one embodiment, the visualization program 110a, 110b may gradually decrease the amount of the visualized dataset until the scope of the visualized dataset is decreased to the minimum available data points.

If the visualization program 110a, 110b counts that there is more than one batch of data points left to be visualized, the visualization program 110a, 110b determines that the subsequent data scope is not the maximum data scope at 214 and returns to 208 to detect the next data scope trigger.

Continuing with the previous example, after the user clicks the flashing button Y to view the subsequent amount (top 30 data points) of the visualized dataset, the visualization program 110a, 110b counts that there 70 more data points left to be visualized in the dataset X and therefore determines that the subsequent amount (top 30 data points) of the visualized dataset is not the maximum scope (top 100 data points) of the visualized dataset. Accordingly, the visualization program 110a, 110b returns to 208 to gradually increase the amount of the visualized dataset until the scope of the visualized dataset is increased to the maximum available 100 data points of dataset X.

However, if the visualization program 110a, 110b counts that there is only one batch of data points left to be visualized, the visualization program 110a, 110b determines that the subsequent data scope is the maximum data scope at 214.

Then, at 216, the visualization program 110a, 110b displays the maximum data scope in response to a final data scope trigger. After the visualization program 110a, 110b determines that the subsequent data scope is the maximum data scope at 214, the visualization program 110a, 110b may determine that the final data scope trigger is detected in a manner similar to detecting the next data scope trigger at 208. Specifically, the visualization program 110a, 110b may determine that the final data scope trigger is detected if the user actuates the trigger (e.g., clicks the button) within the predefined timeframe (e.g., five seconds) instead of performing a different UI gesture (e.g., clicking a different button). Thereafter, the visualization program 110a, 110b may visualize and display the maximum scope of the dataset in the presentation window of the GUI. However, if the time condition and continuity condition are not met, the visualization program 110a, 110b may reset the trigger UI to reflect the initial data scope as described previously at 210. Continuing with the previous example, after the visualization program 110a, 110b displays the top 90 data points of the visualized dataset, the visualization program 110a, 110b counts that there is only one batch of 10 data points left to be visualized in the dataset X. Accordingly, after the user clicks the flashing button Y, the visualization program 110a, 110b displays the maximum data scope (top 100) of the visualized dataset in the presentation window of the dashboard.

According to at least one embodiment, the visualization program 110a, 110b may not be limited to only linearly increasing or decreasing the amount of the visualized dataset. In one embodiment, the trigger UI (e.g., button interface or button label) of the trigger may indicate other conditions such as, "show nodes with at least 100 connections," "show nodes with at least 90 connections," "show nodes with at least 80 connections," "show nodes with at least 70 connections," etc. In one embodiment, when the trigger including "show nodes with at least 100 connections" is clicked, the visualization program 110a, 110b may visualize five nodes in the presentation window of the dashboard and the trigger UI may be modified to reflect "show nodes with at least 90 connections." Then, if the trigger including "show nodes with at least 90 connections" is clicked, the visualization program 110a, 110b may visualize an additional three nodes in the presentation window of the dashboard and the trigger UI may be modified to reflect "show nodes with at least 80 connections." Next, if the trigger including "show nodes with at least 80 connections" is clicked, the visualization program 110a, 110b may visualize an additional 20 nodes in the presentation window of the dashboard and the trigger UI may be modified to reflect "show nodes with at least 70 connections."

Referring now to FIGS. 3A-3D, an exemplary illustration of a dashboard 300 of the visualization program 110a, 110b according to at least one embodiment is depicted.

A user may interact with the visualization program 110a, 110b running on a user laptop (e.g., client computer 102) in order to visualize a network dataset. In response, the visualization program 110a, 110b may transmit a request from the user laptop to the database 114, via communication network 116, and may retrieve the network dataset from the database 114, as described previously at 202. The visualization program 110a, 110b may provide a GUI, such as the dashboard 300 illustrated in FIGS. 3A-3D. The dashboard 300 may include a sorting window 302 in which the visualization program 110a, 110b may list one or more data points, e.g., network interfaces and internet protocol addresses (IPs) 304 of the network dataset, as described previously at 202. In one embodiment, the visualization program 110a, 110b may list the data points 304 in the sorting window 302 according to a default order, which may prioritize the internal nodes before the external nodes. However, in another embodiment, the user may select one or more alternative sorting options 306 from a drop-down menu included in the sorting window 302. In one embodiment, the sorting options 306 may include sorting according to: number of traffic flows, unique outgoing flows, unique incoming flows, total outgoing flows, total incoming flows, unique outgoing rejected flows, unique incoming rejected flows, total outgoing rejected flows, total incoming rejected flows, unique outgoing accepted flows, unique incoming accepted flows, total outgoing accepted flows, and total incoming accepted flows. In another embodiment, other sorting options 306 may be provided according to various applications and datasets.

In one embodiment, once the network dataset is sorted in the sorting window 302, the visualization program 110a, 110b may display a default selection of eight nodes or data points (IPs) in a presentation window 312 of the dashboard 300, as previously described at 204. The sorting window 302 may include a data scope trigger, such as, a button 308 configured to increase the amount of the visualized network dataset. The button 308 may include a dynamic button UI or dynamic button label 308a, as previously described at 204. In an initial state of the button 308, the dynamic button label 308a may include a textual phrase "select top 10", indicating that each batch or scope of the visualized network dataset includes ten data points or nodes, as previously described at 204.

The user may implement the visualization program 110a, 110b to gradually visualize the network connections between various network interfaces and IPs of the network dataset. After the user initially clicks the button 308 using a pointer 310 of the user laptop, the visualization program 110a, 110b may detect the initial data scope trigger and may display an updated initial amount (top 10 IPs) of the visualized network dataset in a presentation window 312 of the dashboard 300 (previously described at 204), as illustrated by the transition between FIG. 3A to FIG. 3B. Specifically, the visualization program 110a, 110b may update the default selection of eight nodes from FIG. 3A to the updated initial amount of the visualized network dataset in FIG. 3B.

After the initial click of the button 308 using the pointer 310, the visualization program 110a, 110b may adjust the dynamic button label 308a to indicate that more expansion may be possible, as previously described at 206. More specifically, in a second state of the button 308, the dynamic button label 308a may include the textual phrase "select top 20" to reflect the next data scope. Additionally, the dynamic button label 308a may animate the button 308 to blink or flash as a way to direct the attention of the user towards the button 308, as previously described at 206. If the user does not click the button 308 in FIG. 3B within the predefined timeframe, such as, five seconds, the dynamic button label 308a may reset the button 308 back to the initial state ("select top 10") illustrated in FIG. 3A, as previously described at 208 and 210. Similarly, if the user performs a different UI action, such as manually deselecting one of the data points 304 using the pointer 310, the dynamic button label 308a may reset the button 308 back to the initial state ("select top 10") illustrated in FIG. 3A, as previously described at 208 and 210. However, if the user does click the button 308 with the pointer 310 in FIG. 3B within the five second predefined timeframe, the visualization program 110a, 110b may detect the next data scope trigger and may display the next amount (top 20 IPs) of the visualized network dataset in the presentation window 312 of the dashboard 300 (previously described at 212), as illustrated by the transition between FIG. 3B to FIG. 3C.

Figure 3A:
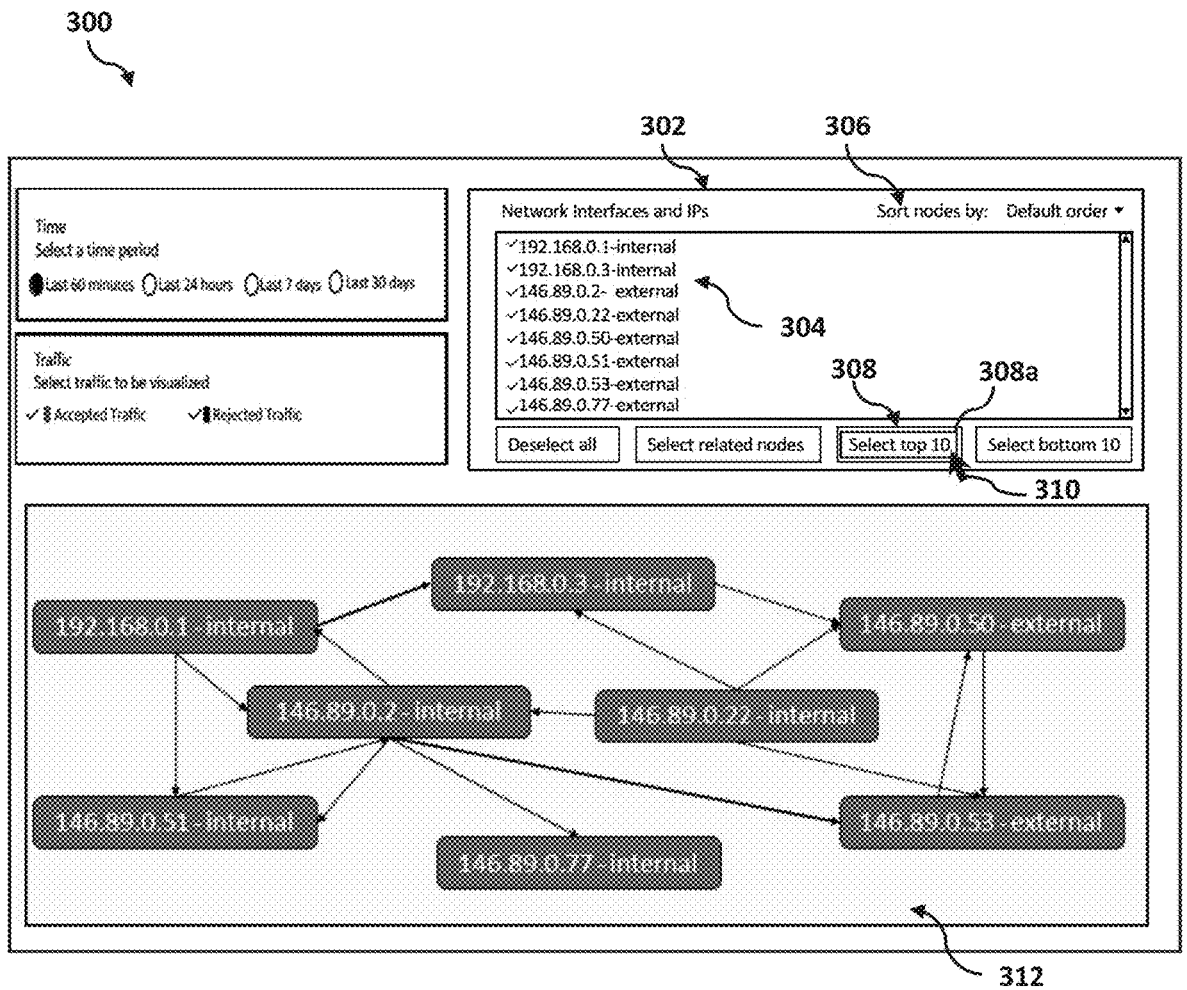
FIG. 3A is a block diagram of a first data visualization state of a graphic user interface of a visualization program according to at least one embodiment.
Figure 3B:
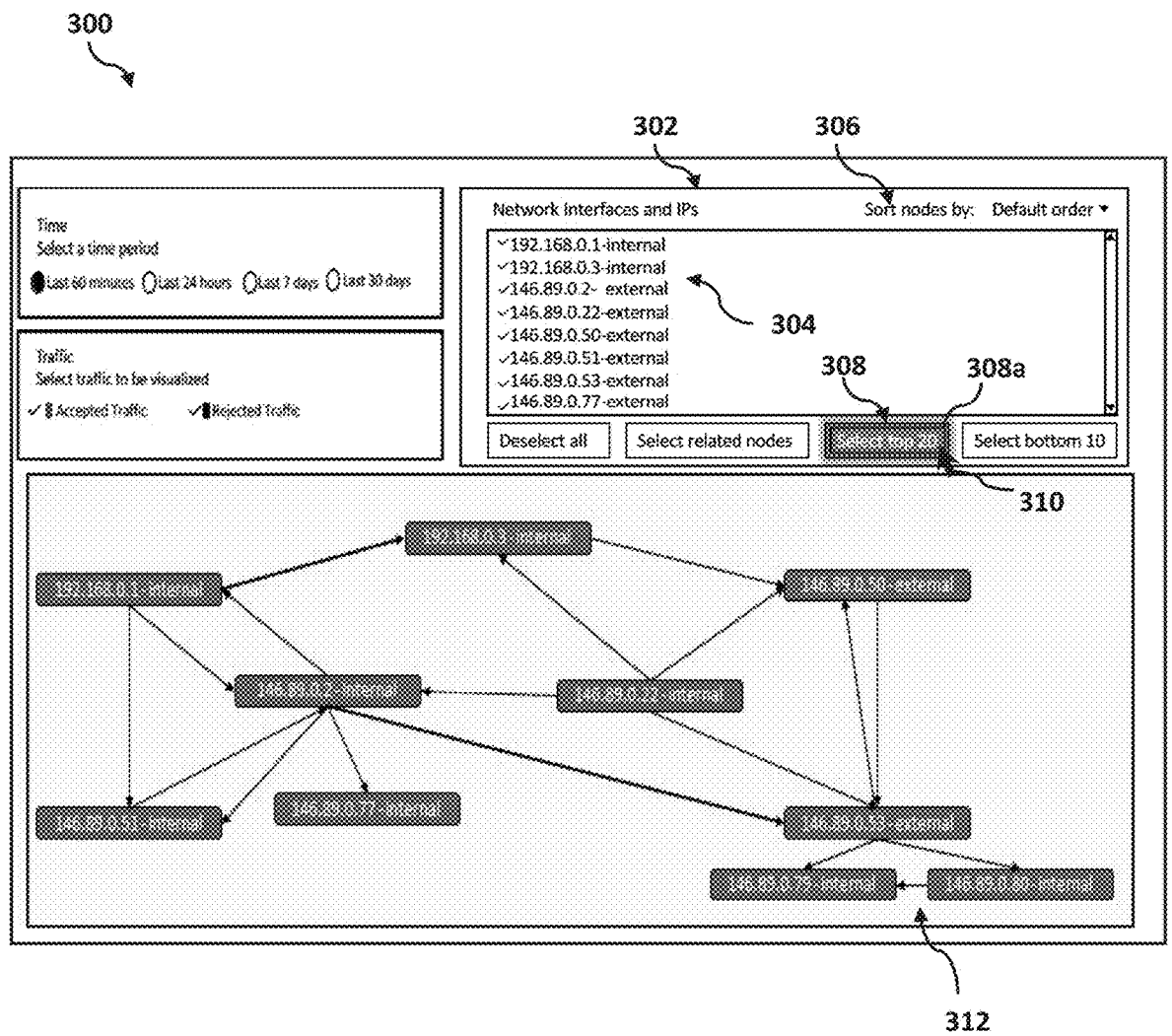
FIG. 3B is a block diagram of a second data visualization state of the graphic user interface depicted in FIG. 3A according to at least one embodiment.
Figure 3C:
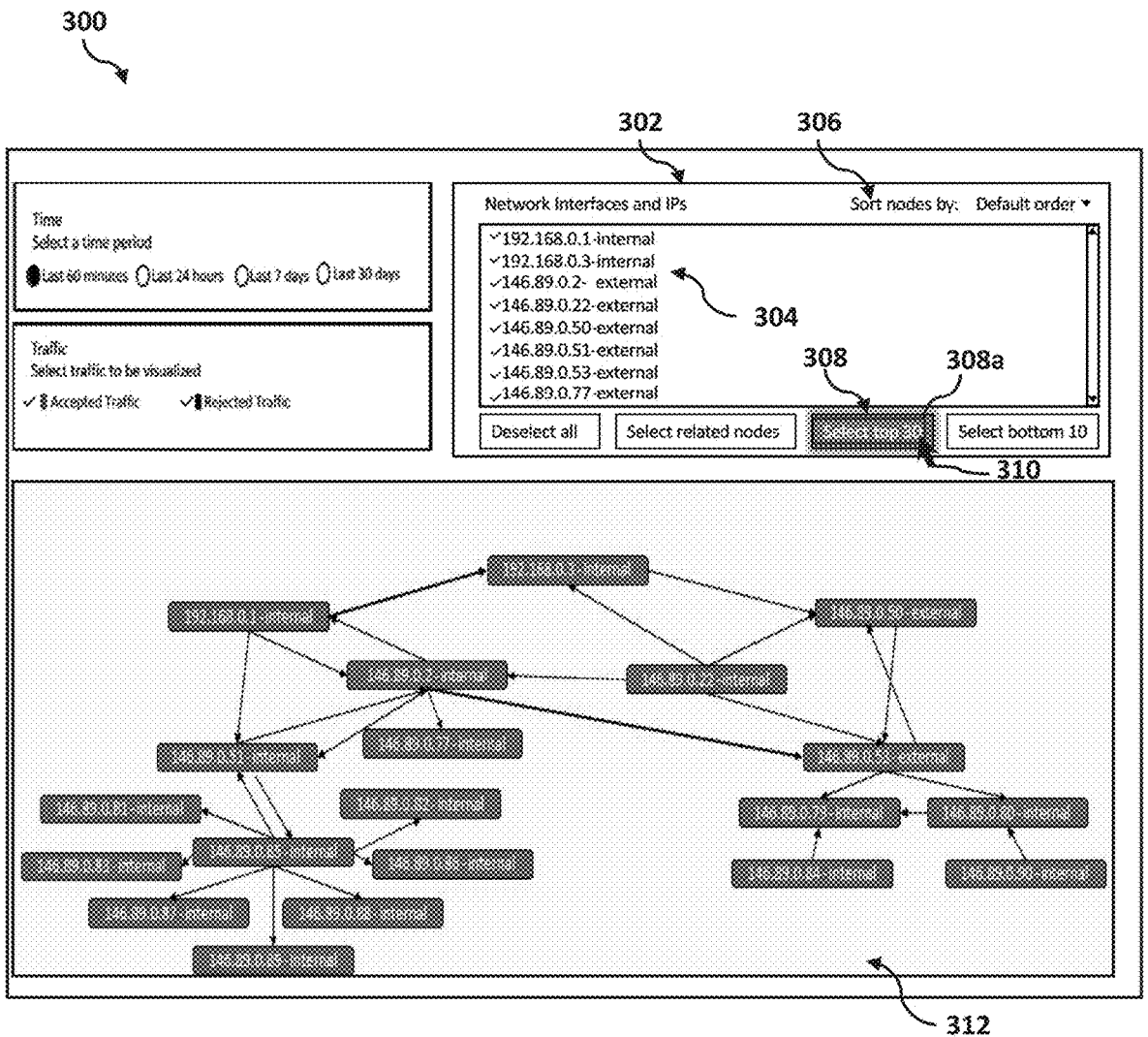
FIG. 3C is a block diagram of a third data visualization state of the graphic user interface depicted in FIG. 3A according to at least one embodiment.
Figure 3D:
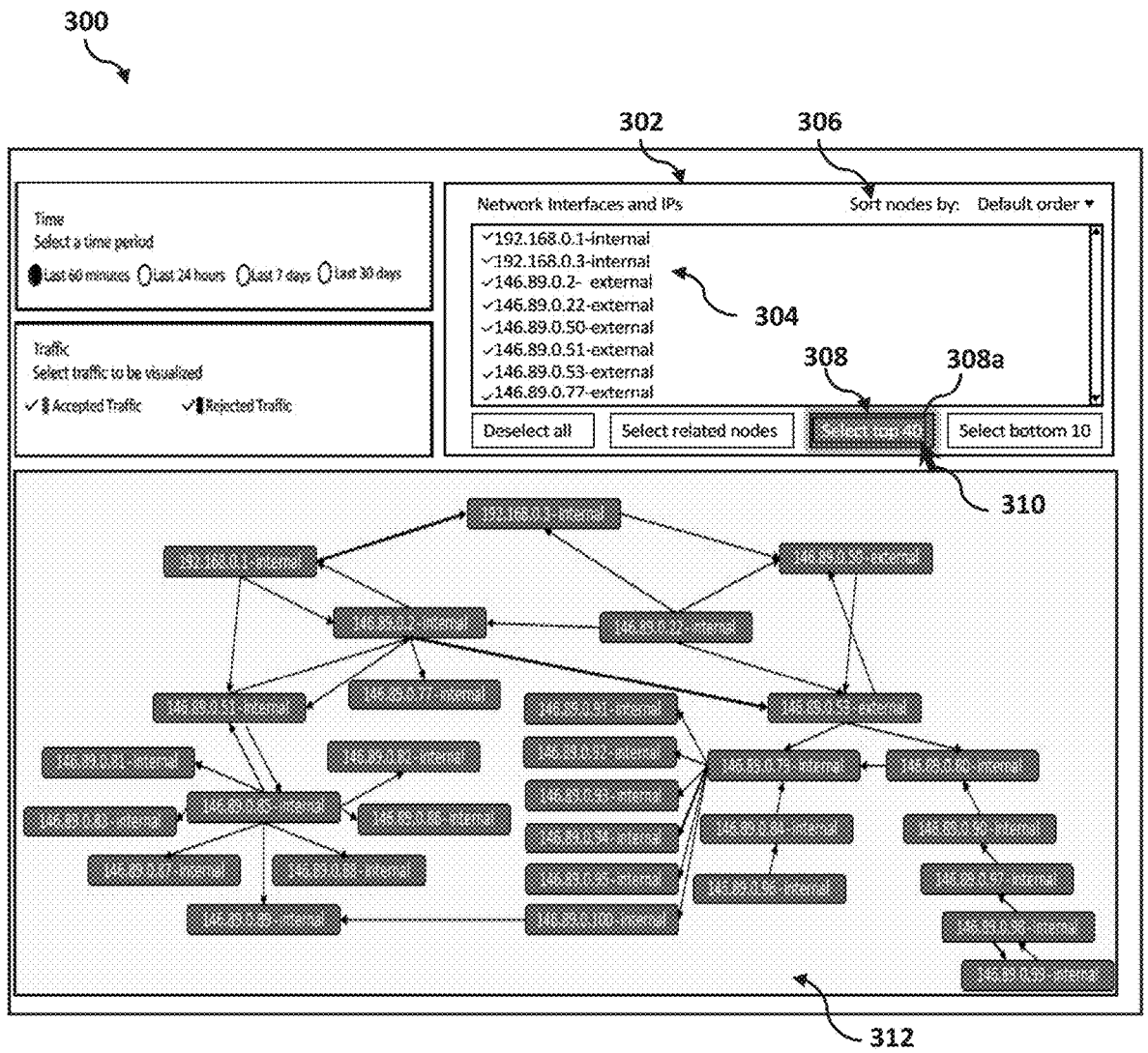
FIG. 3D is a block diagram of a fourth data visualization state of the graphic user interface depicted in FIG. 3A according to at least one embodiment.

As illustrated in FIG. 3C, the visualization program 110a, 110b may readjust the dynamic button label 308a to indicate that more expansion may be possible. More specifically, in a third state of the button 308, the dynamic button label 308a may include the textual phrase "select top 30" to reflect a subsequent data scope, as previously described at 212. Additionally, the dynamic button label 308a may animate the button 308 to blink or flash as a way to direct the attention of the user towards the button 308. In one example, the user may manually deselect one of the data points 304 using the pointer 310. As such, the dynamic button label 308a may reset the button 308 from the third state of the button 308, back to the initial state ("select top 10") illustrated in FIG. 3A. From the initial state illustrated in FIG. 3A, the user may multi-click the button 308 using the pointer 310 to return to the scope of the visualized network dataset, as illustrated in FIG. 3C. Thereafter, the user may click the button 308 with the pointer 310 in FIG. 3C within the five second predefined timeframe and the visualization program 110a, 110b may display the subsequent amount (top 30 IPs) of the visualized network dataset in the presentation window 312 of the dashboard 300, as illustrated by the transition between FIG. 3C to FIG. 3D. As illustrated in FIG. 3D, the visualization program 110a, 110b may readjust the dynamic button label 308a to indicate that more expansion may be possible. More specifically, in a fourth state of the button 308, the dynamic button label 308a may include the textual phrase "select top 40" to reflect a subsequent data scope. The user may continue the interaction with dashboard 300 until the maximum scope of the network dataset is visualized in the presentation window 312.

As described herein, the visualization program 110a, 110b may provide a GUI configured to effectively control the scope of a large dataset being presented in order to meaningfully analyze and extract information from the dataset. The visualization program 110a, 110b may provide a data scope trigger including a dynamic component. The data scope trigger may gradually scale the amount of the dataset being presented. The dynamic component may automatically adjust a visual state of the data scope trigger to reflect a subsequent amount of the dataset which may be presented in response to a user interaction with the data scope trigger. Thus, the visualization program 110a, 110b may improve the functionality of a computer.

It may be appreciated that FIGS. 2 and 3A-3D provide only an illustration of one embodiment and do not imply any limitations with regard to how different embodiments may be implemented. Many modifications to the depicted embodiment(s) may be made based on design and implementation requirements.

Figure 4:
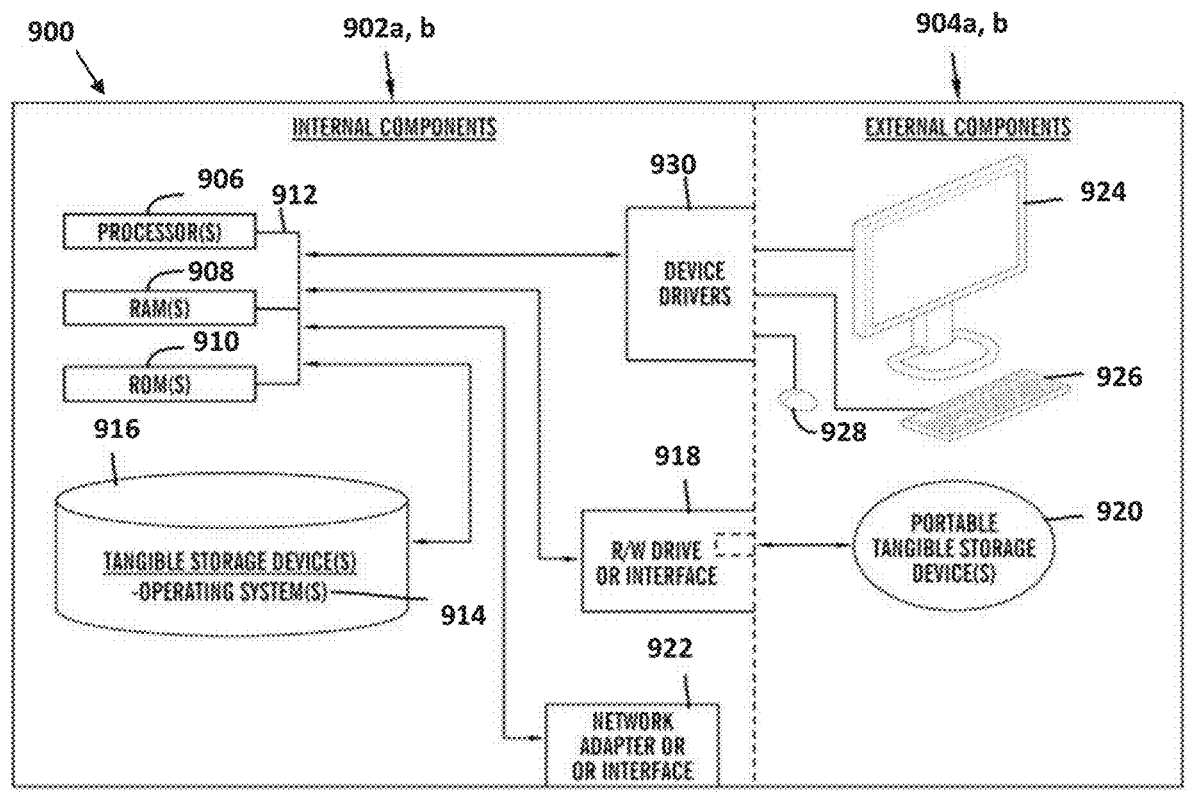
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the visualization program 110a in client computer 102, and the visualization program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the visualization program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the visualization program 110a in client computer 102 and the visualization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the visualization program 110a in client computer 102 and the visualization program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
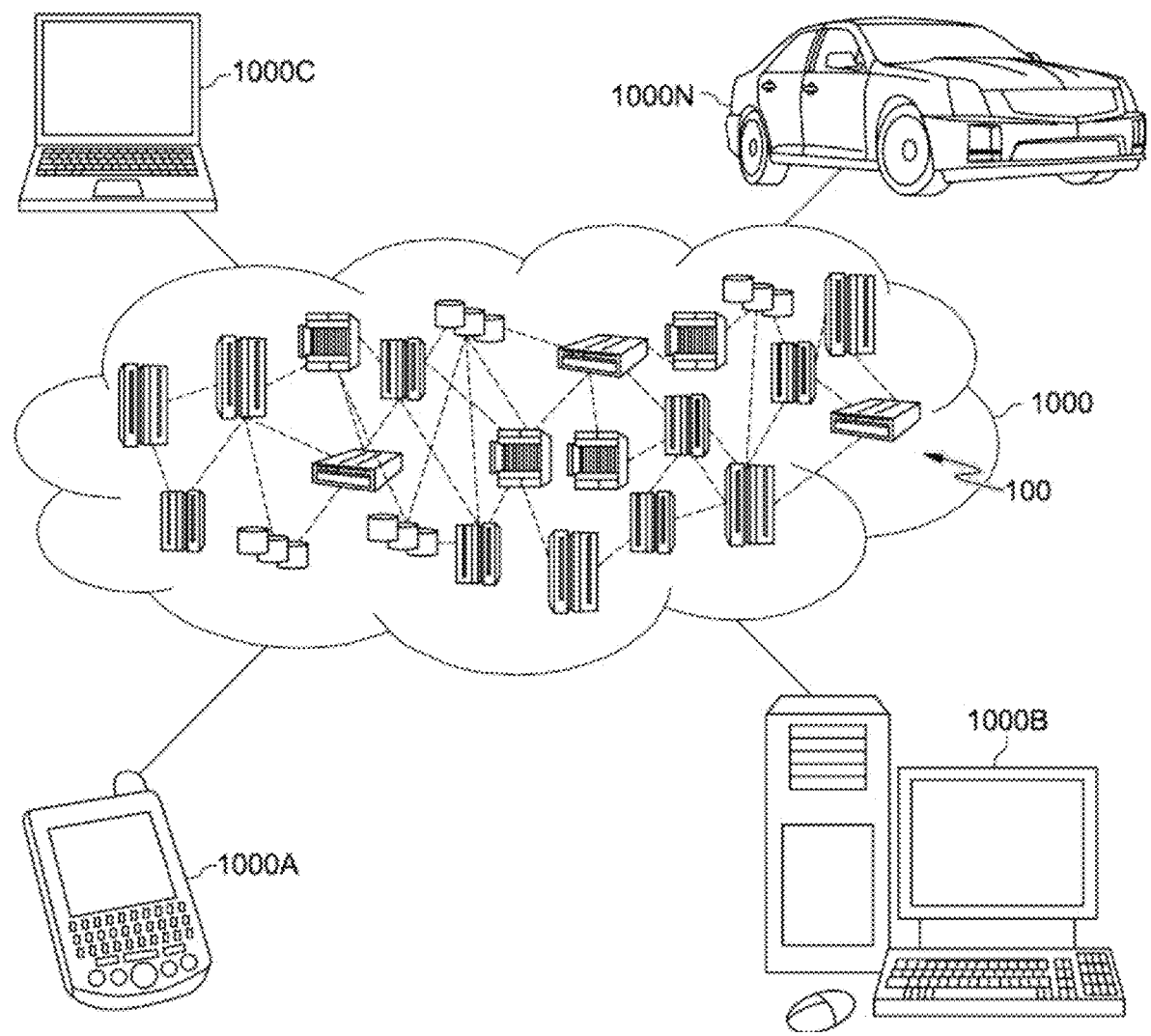
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
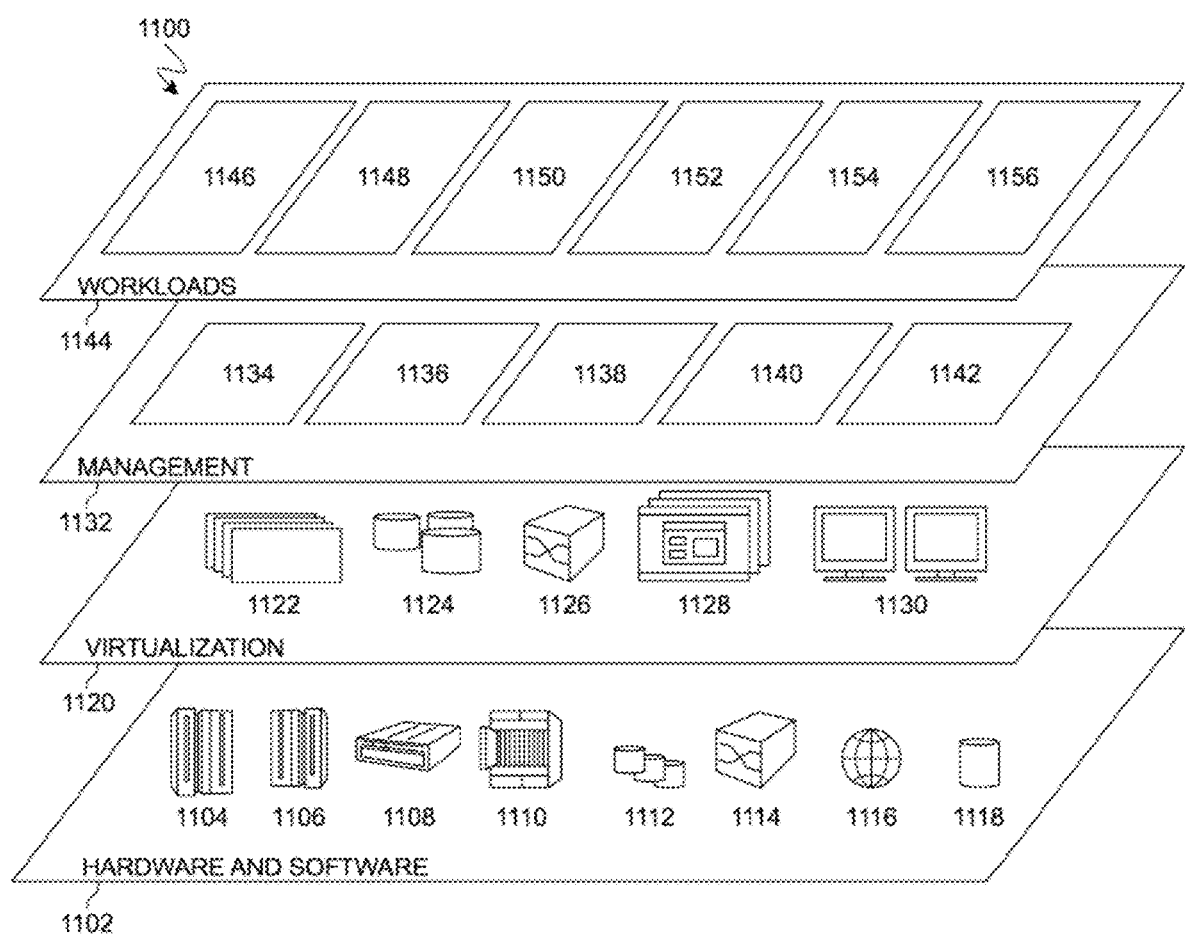
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and visualization 1156. A visualization program 110a, 110b provides a way to gradually control an amount of a visualized dataset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data visualization, the method comprising:
    in response to detecting, by a graphical user interface (GUI), an initial actuation of a data scope trigger, displaying, by the GUI, an initial amount of a dataset; and
    in response to detecting, by the GUI, a subsequent actuation of the data scope trigger within a predefined period of time, modifying an amount of the dataset being displayed by the GUI, and adjusting a trigger user interface (UI) of the data scope trigger to reflect a subsequent amount of the dataset that is available to be displayed by the GUI in response to the detected subsequent actuation of the data scope trigger.

2. The method of claim 1, further comprising:
    in response to determining that the predefined period of time has expired without receiving the subsequent actuation of the data scope trigger, resetting the data scope trigger to an initial state, wherein a further actuation of the reset data scope trigger is configured to display the initial amount of the dataset.

3. The method of claim 2, wherein resetting the data scope trigger to the initial state further comprises:
    reverting the adjusted trigger UI to reflect the initial amount of the dataset that is available to be displayed in response to the further actuation of the reset data scope trigger.

4. The method of claim 1, further comprising:
    in response to detecting, by the GUI, a UI actuation that is different from the subsequent actuation of the data scope trigger, resetting the data scope trigger to an initial state, wherein a further actuation of the reset data scope trigger is configured to display the initial amount of the dataset.

5. The method of claim 1, further comprising:
    adjusting the trigger UI of the data scope trigger for the predefined period of time.

6. The method of claim 5, wherein adjusting the trigger UI of the data scope trigger for the predefined period of time further comprises:
    providing a textual phrase on a dynamic button label indicating the subsequent amount of the dataset that is available to be displayed by the GUI in response to the subsequent actuation of the data scope trigger; and
    animating the dynamic button label to prompt a user for the subsequent actuation of the data scope trigger.

7. The method of claim 1, further comprising:
    listing, in the GUI, a plurality of data points of the dataset according to a user-selected sorting option.

8. The method of claim 7, further comprising:
    in response to detecting, by the GUI, a UI actuation configured to deselect an individual data point of the plurality of data points of the dataset, resetting the data scope trigger to an initial state, wherein a further actuation of the reset data scope trigger is configured to display the initial amount of the dataset.

9. A computer system for data visualization, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    in response to detecting, by a graphical user interface (GUI), an initial actuation of a data scope trigger, displaying, by the GUI, an initial amount of a dataset; and
    in response to detecting, by the GUI, a subsequent actuation of the data scope trigger within a predefined period of time, modifying an amount of the dataset being displayed by the GUI, and adjusting a trigger user interface (UI) of the data scope trigger to reflect a subsequent amount of the dataset that is available to be displayed by the GUI in response to the detected subsequent actuation of the data scope trigger.

10. The computer system of claim 9, further comprising:
    in response to determining that the predefined period of time has expired without receiving the subsequent actuation of the data scope trigger, resetting the data scope trigger to an initial state, wherein a further actuation of the reset data scope trigger is configured to display the initial amount of the dataset.

11. The computer system of claim 10, wherein resetting the data scope trigger to the initial state further comprises:
    reverting the adjusted trigger UI to reflect the initial amount of the dataset that is available to be displayed in response to the further actuation of the reset data scope trigger.

12. The computer system of claim 9, further comprising:
    in response to detecting, by the GUI, a UI actuation that is different from the subsequent actuation of the data scope trigger, resetting the data scope trigger to an initial state, wherein a further actuation of the reset data scope trigger is configured to display the initial amount of the dataset.

13. The computer system of claim 9, further comprising:
    adjusting the trigger UI of the data scope trigger for the predefined period of time.

14. The computer system of claim 13, wherein adjusting the trigger UI of the data scope trigger for the predefined period of time further comprises:
- providing a textual phrase on a dynamic button label indicating the subsequent amount of the dataset that is available to be displayed by the GUI in response to the subsequent actuation of the data scope trigger; and
- animating the dynamic button label to prompt a user for the subsequent actuation of the data scope trigger.

15. The computer system of claim 9, further comprising: listing, in the GUI, a plurality of data points of the dataset according to a user-selected sorting option.

16. The computer system of claim 15, further comprising:
- in response to detecting, by the GUI, a UI actuation configured to deselect an individual data point of the plurality of data points of the dataset, resetting the data scope trigger to an initial state, wherein a further actuation of the reset data scope trigger is configured to display the initial amount of the dataset.

17. A computer program product for data visualization, comprising:
- one or more computer-readable tangible storage media and program instructions stored on at least one of the one or more computer-readable tangible storage media, the program instructions executable by a processor to cause the processor to perform a method comprising:
- in response to detecting, by a graphical user interface (GUI), an initial actuation of a data scope trigger, displaying, by the GUI, an initial amount of a dataset; and
- in response to detecting, by the GUI, a subsequent actuation of the data scope trigger within a predefined period of time, modifying an amount of the dataset being displayed by the GUI, and adjusting a trigger user interface (UI) of the data scope trigger to reflect a subsequent amount of the dataset that is available to be displayed by the GUI in response to the detected subsequent actuation of the data scope trigger.

18. The computer program product of claim 17, further comprising:
- in response to determining that the predefined period of time has expired without receiving the subsequent actuation of the data scope trigger, resetting the data scope trigger to an initial state, wherein a further actuation of the reset data scope trigger is configured to display the initial amount of the dataset.

19. The computer program product of claim 17, further comprising:
- in response to detecting, by the GUI, a UI actuation that is different from the subsequent actuation of the data scope trigger, resetting the data scope trigger to an initial state, wherein a further actuation of the reset data scope trigger is configured to display the initial amount of the dataset.

20. The computer program product of claim 17, further comprising:
- adjusting the trigger UI of the data scope trigger for the predefined period of time.

* * * * *